(12) United States Patent
Bedell et al.

(10) Patent No.: US 7,536,774 B2
(45) Date of Patent: May 26, 2009

(54) METHOD AND APPARATUS FOR INTEGRATING A STAIR NOTCH AND A GAP BUMP AT A POLE TIP IN A WRITE HEAD

(75) Inventors: Daniel Wayne Bedell, Gilroy, CA (US); Wen-Chien David Hsiao, San Jose, CA (US); Ming Jiang, San Jose, CA (US); Hieu Lam, Milpitas, CA (US); Kim Y. Lee, Freemont, CA (US); Jyh-Shuey Lo, San Jose, CA (US); Aron Pentek, San Jose, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 355 days.

(21) Appl. No.: 11/399,821

(22) Filed: Apr. 7, 2006

(65) Prior Publication Data

US 2007/0236833 A1    Oct. 11, 2007

(51) Int. Cl.
*G11B 5/127* (2006.01)
(52) U.S. Cl. .............................. 29/603.13; 360/125.06
(58) Field of Classification Search ............ 360/125.06, 360/125.22, 125.43, 125.55, 125.56; 29/603.13
See application file for complete search history.

(56) References Cited

U.S. PATENT DOCUMENTS

| | | | |
|---|---|---|---|
| 5,438,747 A | 8/1995 | Krounbi et al. | |
| 5,802,700 A | 9/1998 | Chen et al. | |
| 5,916,423 A | 6/1999 | Westwood | |
| 6,106,679 A | 8/2000 | Westwood | |
| 6,539,610 B1 | 4/2003 | Lo et al. | |
| 6,621,660 B2 | 9/2003 | Hsiao et al. | |
| 6,747,850 B1 | 6/2004 | Chang et al. | |
| 7,394,621 B2* | 7/2008 | Li et al. | 360/125.15 |
| 2003/0043504 A1 | 3/2003 | Dinan et al. | |
| 2004/0027716 A1* | 2/2004 | Chen et al. | 360/126 |
| 2004/0051999 A1* | 3/2004 | Yazawa et al. | 360/126 |
| 2004/0070875 A1 | 4/2004 | Hsiao et al. | |
| 2005/0083606 A1 | 4/2005 | Lee et al. | |
| 2005/0241139 A1 | 11/2005 | Lee et al. | |
| 2005/0270695 A1 | 12/2005 | Hsiao et al. | |
| 2005/0280938 A1* | 12/2005 | Sasaki et al. | 360/126 |

* cited by examiner

*Primary Examiner*—Angel A. Castro
(74) *Attorney, Agent, or Firm*—Merchant & Gould

(57) ABSTRACT

A method and apparatus for integrating a stair notch and a gap bump at a pole tip in a write head is disclosed. A protective plated layer is formed over the bump to prevent the bump form being damaged during formation of the notch at the pole tip. The flux from the second pole outside of the track will be effectively channeled to the first pole piece under the alumina bump.

12 Claims, 12 Drawing Sheets

METHOD AND APPARATUS FOR INTEGRATING A STAIR NOTCH AND A GAP BUMP AT A POLE TIP IN A WRITE HEAD

BACKGROUND OF THE INVENTION

1. Field of the Invention

This invention relates in general to a magnetic head for magnetic storage devices, and more particularly to a method and apparatus for integrating a stair notch and a gap bump at a pole tip in a write head.

2. Description of Related Art

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces using recording heads. Read heads are then used to read data from the tracks on the disk surfaces. Read and write heads can be formed together on a single slider.

In a disk drive, a magnetic recording head is made of read and write elements. The write element is used to record and erase data bits arranged in circular tracks on the disk while the read element plays back a recorded magnetic signal. The magnetic recording head is mounted on a slider that is connected to a suspension arm, the suspension arm urging the slider toward a magnetic storage disk. When the disk is rotated the slider flies above the surface of the disk on a cushion of air which is generated by the rotating disk.

Layered thin film structures are typically used in the manufacture of read and write heads. In write heads, thin film structures provide high areal density, which is the amount of data stored per unit of disk surface area, and in read heads they provide high resolution. A thin film write head may have two pole pieces, namely, a top pole piece (colloquially referred to as "P2") and a bottom pole piece ("P1"). A write head generally has two regions, denoted a pole tip region and a back region. The pole pieces are formed from thin magnetic material films and converge in the pole tip region at a magnetic recording gap, and in the back region at a back gap.

At least one coil layer is embedded in an insulation stack. A nonmagnetic write gap layer is located between the pole tips of the first and second pole pieces and the first and second pole pieces are magnetically connected at the back gap. Processing circuitry digitally energizes the write coil, which induces flux into the first and second pole pieces so that flux signals bridge across the write gap at the ABS to write the aforementioned signal field or magnetized bits into the track of the rotating disk.

A write head also has two pole tips, sometimes denoted "P1T" and "P2T", which are associated with and are extensions of the poles P1 and P2, respectively. The pole tips, which are relatively defined in their shape and size in contrast to the pole pieces, are separated from each other by a thin layer of non-magnetic material such as alumina or Rhodium, referred to as a gap. As a magnetic disk is spinning beneath a write head, the P2 pole tip P2T trails the P1 pole tip P1T and is therefore the last to induce flux on the disk. Thus, the P2T dimension predominantly defines the write track width of the write head, and is generally considered an important feature.

The write track width, which is related to the width "P2B" of the bottom of the pole P2, is especially important because it limits the areal density of a magnetic disk. A write head is typically rated by its areal density, which is a product of its linear bit density and its track width density. The linear bit density is the number of bits that can be written per linear inch along the track of a rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the thickness of the write gap layer, pole materials, throat height, fly height and media characteristics. The track width density is directly dependent upon the width of the second pole tip at the ABS. A narrower track width translates to greater tracks per inch (TPI) written on the disk, which in turn translates to greater areal density. However, with present manufacturing methods for read-write heads, the ability to produce very narrow track widths is limited. Efforts over the years to increase the areal density have resulted in increased computer storage capacities over the past few decades.

One problem encountered as the track width continues to decrease involves large side-fringing fields during recording. The fringing field, caused by flux leakage from the second pole (P2) to the first pole (P1) beyond the width of the second pole (P2), is the portion of the magnetic field that extends toward the tracks adjacent to the tracks being written.

The throat height of a write head plays a key role in obtaining a desirable BPI. The throat height of a write head is the distance from the ABS to a recessed location within the head where the first and second pole pieces first commence to separate after the ABS. The recessed location is referred to in the art as the zero throat height (ZTH). As write gap and fly height is decreased, the short throat height length is required to render high efficiencies with sufficient write field and field gradient for linear bit definition. The tolerance control of throat height variation is critical for a short throat height writer to ensure consistent writer performance and device yield. Because less magnetic flux crosses the gap as the pole layers are further separated, a short throat height is desirable in obtaining a fringing field for writing to the media that is a significant fraction of the total flux crossing the gap. Typically the throat height is determined by the curve of the second pole layer away from the gap.

Once the second pole tip is formed, it is desirable to notch the first pole piece opposite the first and second bottom corners of the second pole tip. Notching the first pole piece minimizes side writing in tracks written on the magnetic disk. As is known, when the tracks are overwritten by side writing the track density of the magnetic disk is reduced.

The flux leakage into an adjacent track is proportional to the ratio of how easy the flux may leak into an adjacent track to how easy the flux is maintained on the desired track. The ability to maintain the flux on the desired track depends more on P1 than P2 because P1 is more prone to saturation. Therefore, there is an advantage in making the P1 width wider. However, the wider P1 is, the easier it is for flux to leak into an adjacent track. The ease with which flux leaks into an adjacent track depends on the distance of the P2 to P1 footing. The deeper the notch depth, the more difficult it is for the flux to leak into an adjacent track. However, the deeper notch also makes it hard for the flux to stay on track.

When the first pole piece is notched, it has first and second sidewalls that are aligned with first and second sidewalls of the second pole tip, so that the first pole piece and the second pole tip have the same track width at the ABS. This minimizes fringing of magnetic fields from the second pole tip laterally beyond the track width (side writing) to a wide expanse of the first pole piece.

Another method for minimizing side writing in tracks written on the magnetic disk is to form a bump that it extends into a portion of the second pole tip. Because the bump extends into the second pole tip, the throat height (TH) is defined by the bump. Thus, the throat height, which is particularly important to define writer efficiency particularly for high tracks-per-inch (TPI) narrow pole width application, may be accurately defined to allow a strong field at the pole tip while minimizing the transition width, which in turn creates side writing that can make high density recording impossible.

By forming a notch in a pole and a gap bump, the width of the bottom of the second pole (P2B) sigma may be increased, i.e., differences between widths of the bottom of the second pole wafer to wafer in the manufacturing process, for the plating of the second pole (P2). Notching is used to reduce the width of the second pole tip (P2T) due to the increase in the gap thickness, which can be four times thicker. Thus, integration of a notch at the pole tip and a gap bump is difficult because these two structures are by nature perpendicular to each other and the notch process tends to destroy the bump structure.

It can be seen that there is a need for a method and apparatus for integrating a stair notch and a gap bump at a pole tip in a write head.

SUMMARY OF THE INVENTION

To overcome the limitations in the prior art described above, and to overcome other limitations that will become apparent upon reading and understanding the present specification, the present invention discloses a method and apparatus for integrating a stair notch and a gap bump at a pole tip in a write head.

The present invention solves the above-described problems by forming a protective plated layer over the bump to prevent the bump form being damaged during formation of the notch at the pole tip. The flux from the second pole outside of the track will be effectively channeled to the first pole piece under the alumina bump.

A method for forming a write head having an integrated stair notch and gap bump in accordance with the principles of the present invention includes forming a first pole piece, forming a gap bump over the first pole piece away from an air-bearing surface, forming a gap layer over the first pole piece and the gap bump, forming a second pole piece over the gap layer, performing a first notching process to narrow the second pole layer to form the desired width of the pole tip of the second pole piece, forming a protection layer over the second pole piece at the desired bump location and performing a second notching process to form a desired stair notching structure in the first pole piece at the air-bearing surface.

In another embodiment of the present invention, a write head is provided. The write head includes a first pole piece, a gap bump formed over the first pole piece away from an air-bearing surface, a gap layer formed over the first pole piece and the gap bump, a second pole piece formed over the gap layer, the second pole piece including a pole tip defined to provide a desired pole tip width and a protective layer formed over the second pole piece and the gap layer, wherein the first pole piece is notched at the air-bearing surface.

In another embodiment of the present invention, a magnetic storage device is provided. The magnetic storage device includes a magnetic media for storing data thereon, a motor, coupled to the magnetic media, for translating the magnetic media, a transducer for reading and writing data on the magnetic media and an actuator, coupled to the transducer, for moving the transducer relative to the magnetic media, wherein the transducer includes a write head, including a first pole piece, a gap bump formed over the first pole piece away from an air-bearing surface, a gap layer formed over the first pole piece and the gap bump, a second pole piece formed over the gap layer, the second pole piece including a pole tip defined to provide a desired pole tip width and a protective layer formed over the second pole piece and the gap layer, wherein the first pole piece is notched at the air-bearing surface.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for integrating a stair notch and a gap bump at a pole tip in a write head. A protective plated layer is formed over the bump to prevent the bump form being damaged during formation of the notch at the pole tip. The flux from the second pole outside of the track will be effectively channeled to the first pole piece under the alumina bump.

Figure 1:
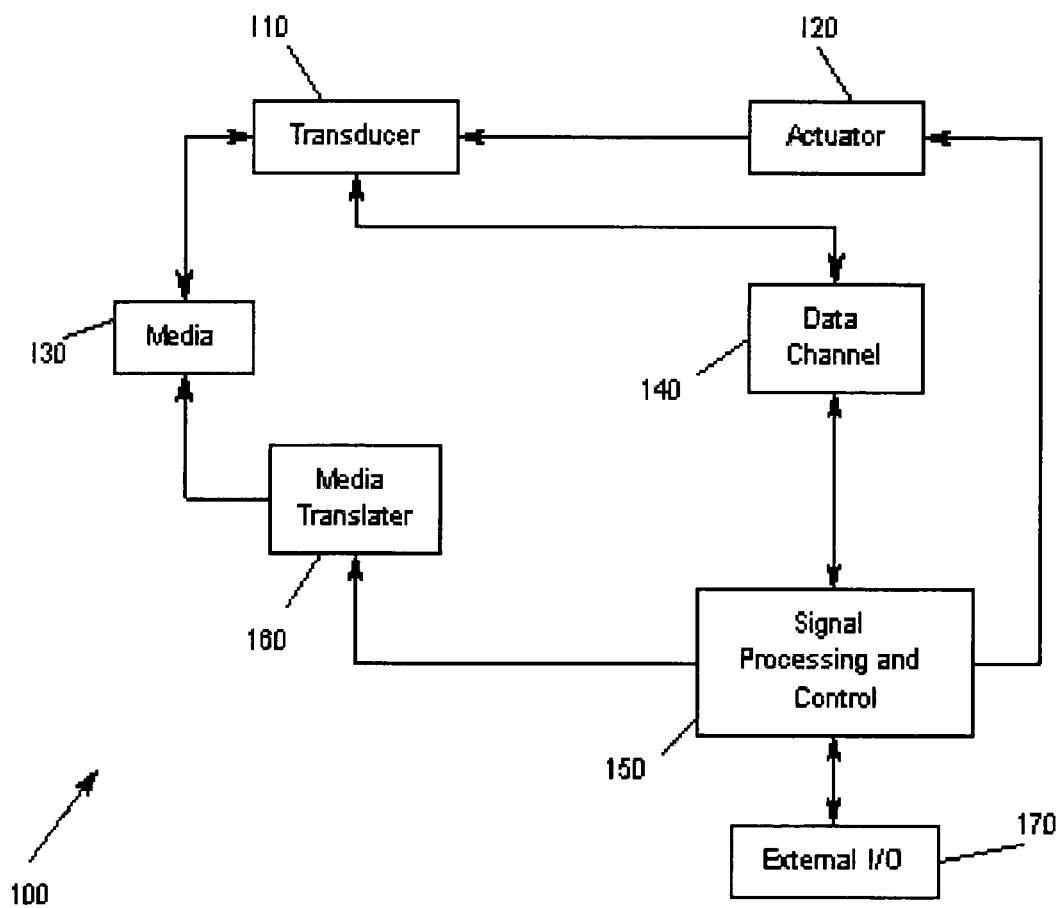
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
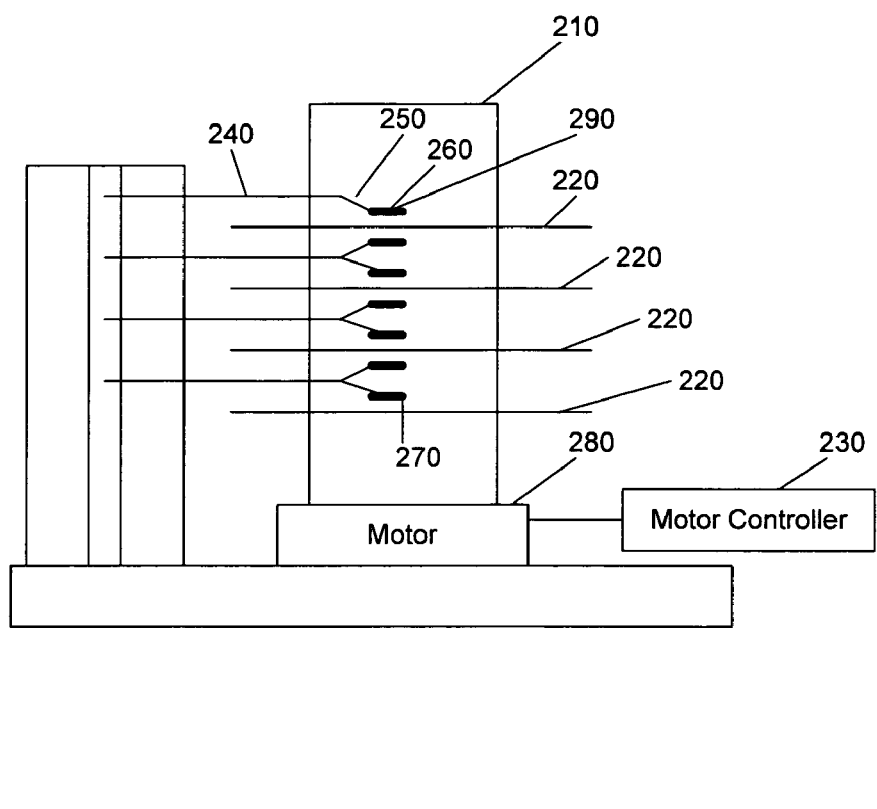
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
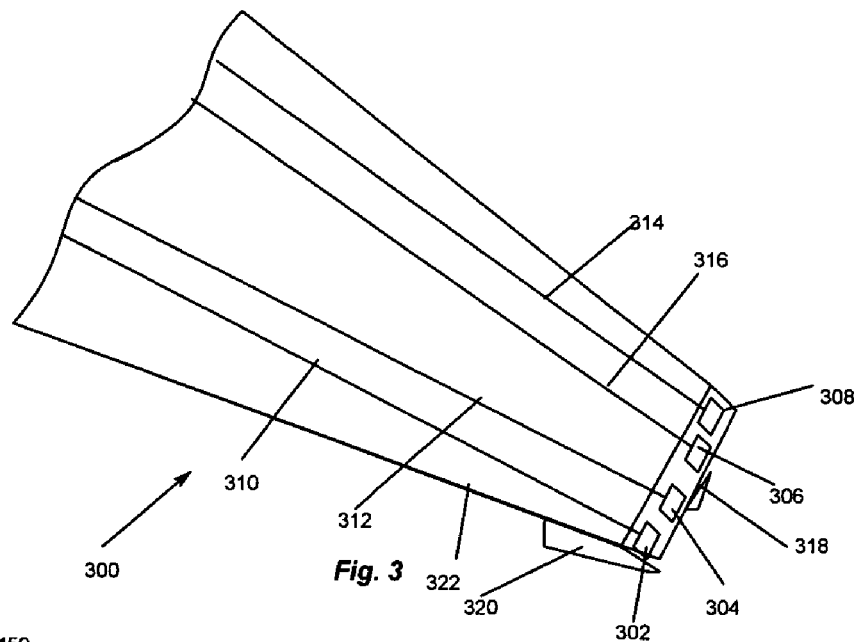
FIG. 3 illustrates a slider mounted on a suspension according to an embodiment of the present invention.

FIG. 3 illustrates a sensor assembly 300. In FIG. 3, a slider 320 is mounted on a suspension 322. First and second connections 302 and 308 connect leads from the sensor 318 to leads 310 and 314, respectively, on suspension 322 and third and fourth connections 304 and 306 connect to the write coil (not shown) to leads 312 and 316, respectively, on suspension 322. Although only four connections are shown in the illustration, more than four connections are equally viable in accordance with the present invention.

Figure 4:
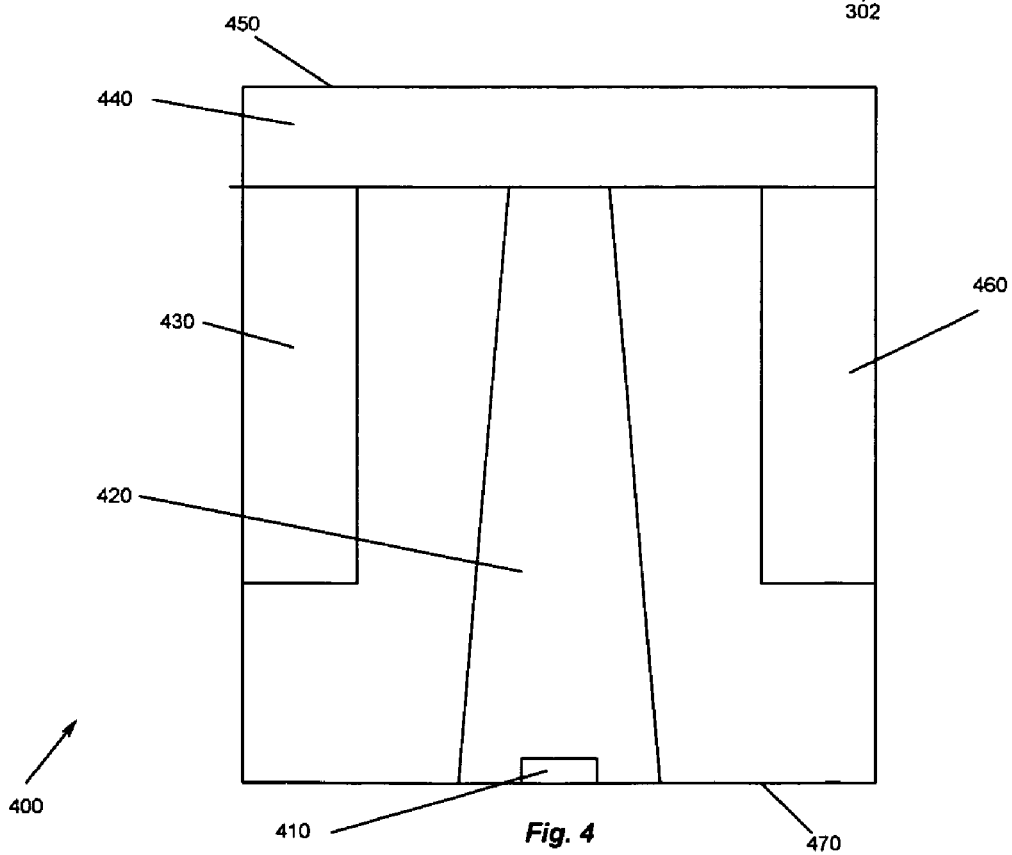
FIG. 4 illustrates an ABS view of the slider and the magnetic head according to an embodiment of the present invention.

FIG. 4 is an ABS view of slider 400 and magnetic head 410. The slider has side rails 430 and 460 and a center rail 420. A magnetic head 410 is provided and may be supported on the central rail 420. However, the head may be disposed otherwise, e.g., on a side rail. The rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
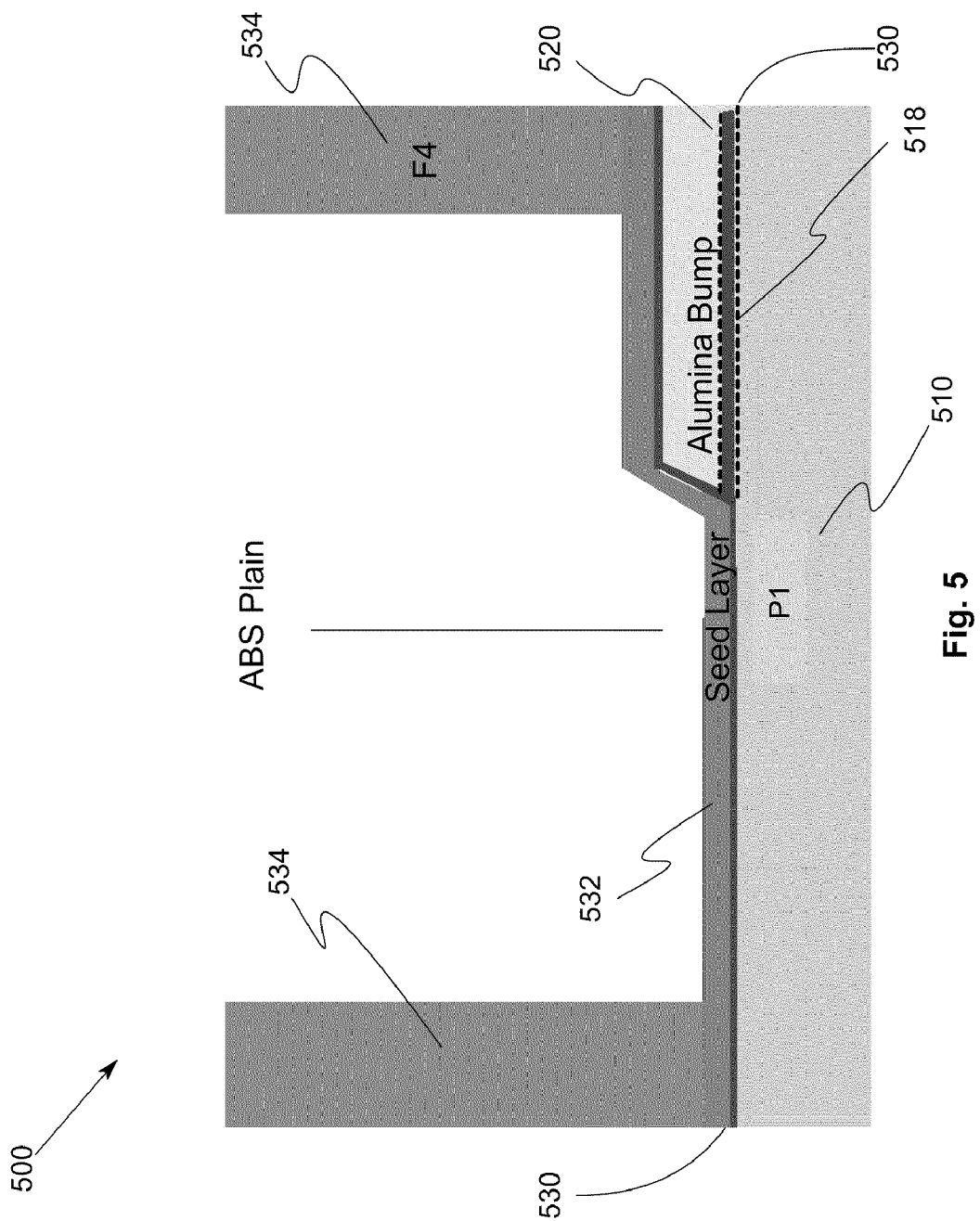
FIG. 5 illustrates a framed structure showing the initial layers of a write head according to an embodiment of the present invention.

FIGS. 5-11 show the method for integrating a stair notch and a gap bump at a pole tip in a write head according to an embodiment of the present invention. In FIG. 5, illustrates a framed structure 500 showing the initial layers of a write head according to an embodiment of the present invention in a cross sectional view perpendicular to the ABS plane. In FIG. 5, a first pole piece 510 (P1) is formed. A gap bump 520 is formed at one end of the first pole piece 510. The gap bump 520 may be formed, for example, by depositing a layer of alumina using a liftoff process. A non-magnetic gap layer 530 is then deposited over the gap bump 520 and the exposed first pole piece 510. A high magnetic moment seed layer (e.g., NiFe or CoFe) 532 is formed over the gap layer 530 usually by sputter deposititon. A photo resist frame 534 (PR) is then formed at each end of the structure after the seed layer 532 is formed. The gap layer 530 can also be deposited over the first pole piece 510 before the gap bump 520 is formed as shown by the dotted line 518.

Figure 6:
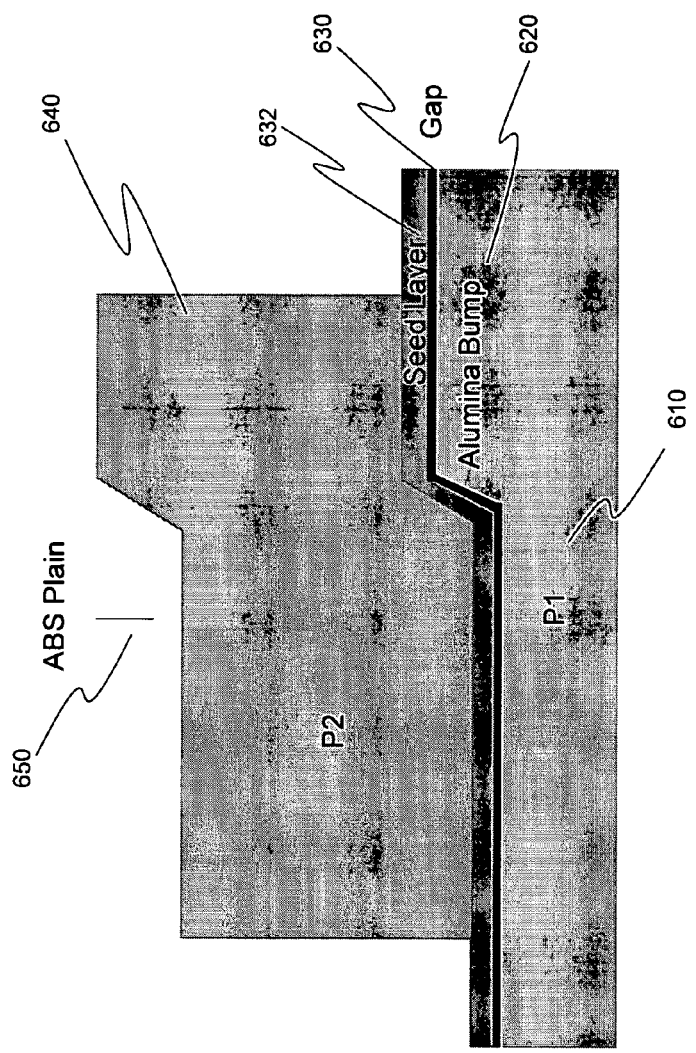
FIG. 6 shows a structure after formation of the second pole layer according to an embodiment of the present invention.

FIG. 6 shows a structure 600 after formation of the second pole layer according to an embodiment of the present invention. In FIG. 6, the second pole layer 640 is electroplated between the frame (PR) and then the frame is removed. The second pole piece is a high magnetic moment material (e.g., NiFe or CoFe alloy). A portion of the second pole layer 640 is thus disposed over the gap bump 620 and a second portion of the second pole layer 640 is disposed over the first pole piece 610. The seed layer 632 and the gap layer 630 are disposed therebetween. The air-bearing surface plane 650 is shown also.

Figure 7:
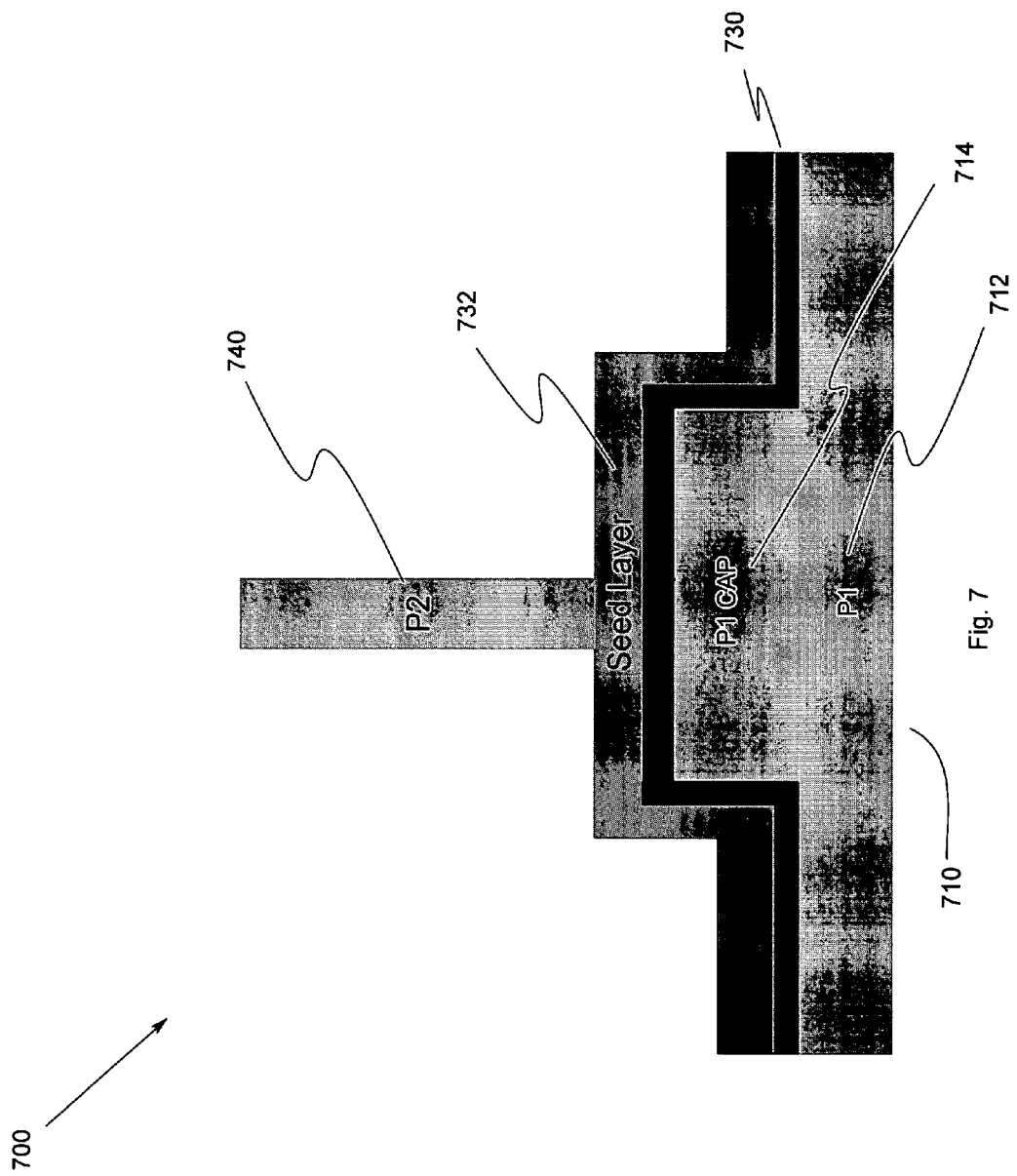
FIG. 7 is a side view of the structure shown in FIG. 6 along the air-bearing surface plane.

FIG. 7 is a side view 700 of the structure shown in FIG. 6 along the air-bearing surface plane. In FIG. 7, the first pole piece 710 is shown notched. The first pole piece includes a first pole piece layer 712 (P1) and a second pole piece layer 714 (P1CAP). The gap bump is not shown because it is offset from the air-bearing surface plane as shown in FIG. 6. The gap layer 730 is shown over the exposed second pole piece layer 714. The seed layer 732 is formed over the seed layer 732. The second pole layer 740 is formed in a central region over the seed layer 732.

Figure 8:
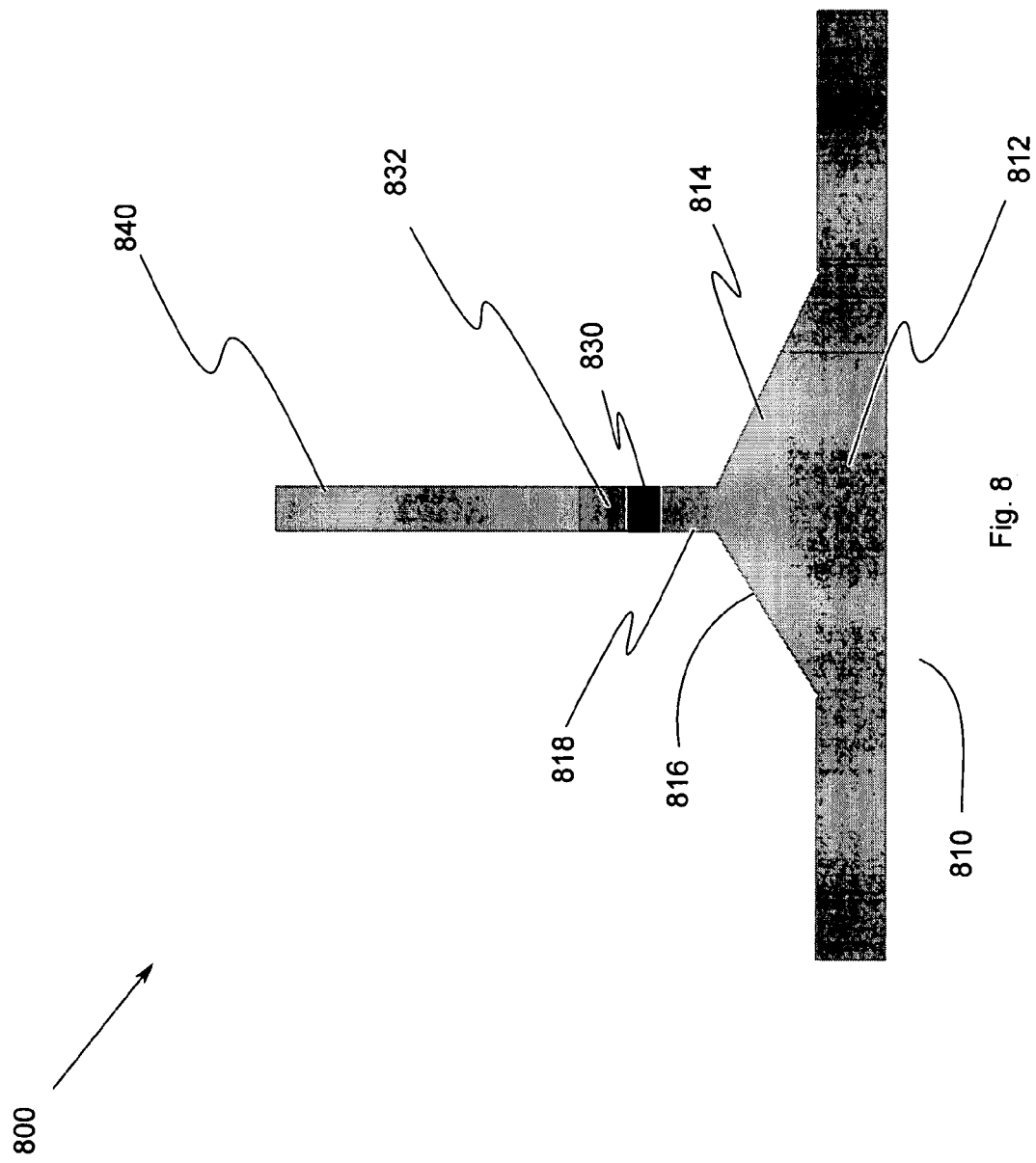
FIG. 8 shows the write head after the structure shown in FIG. 7 is processed to remove portions of the layers.

FIG. 8 shows the write head 800 after the structure shown in FIG. 7 is processed to remove portions of the layers. In FIG. 8, a trim and notch trim ion milling process has been used to remove material. The second pole layer 840 is narrowed along with the seed layer 832 and the gap layer 830. Material from the second pole piece layer 814 has been removed leaving a notched portion 816 and a narrow extending portion 818. Because the erosion of the sharp corners during the ion milling the sidewalls of the second pole piece 814 have a tapered shape.

Figure 9:
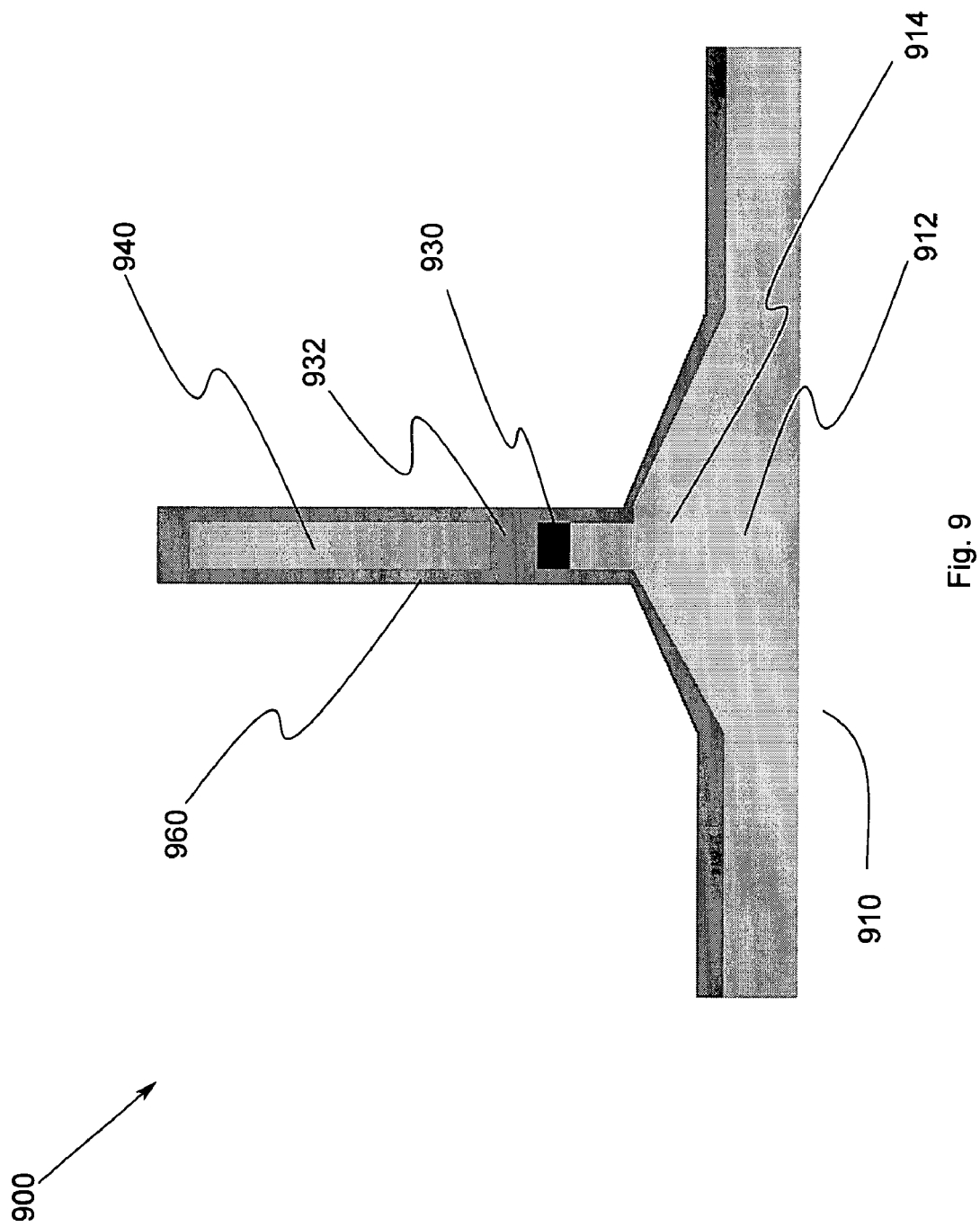
FIG. 9 shows the write head having a protection layer deposited according to an embodiment of the present invention.

FIG. 9 shows the write head 900 having a protection layer deposited according to an embodiment of the present invention. A protection layer such as alumina 960 is deposited over the second pole layer. The protection layer 960 also covers the first pole piece layer 912 and the second pole piece layer 914. The protection layer can be deposited by sputtering, ion beam deposition or atomic layer deposition (ALD).

Figure 10:
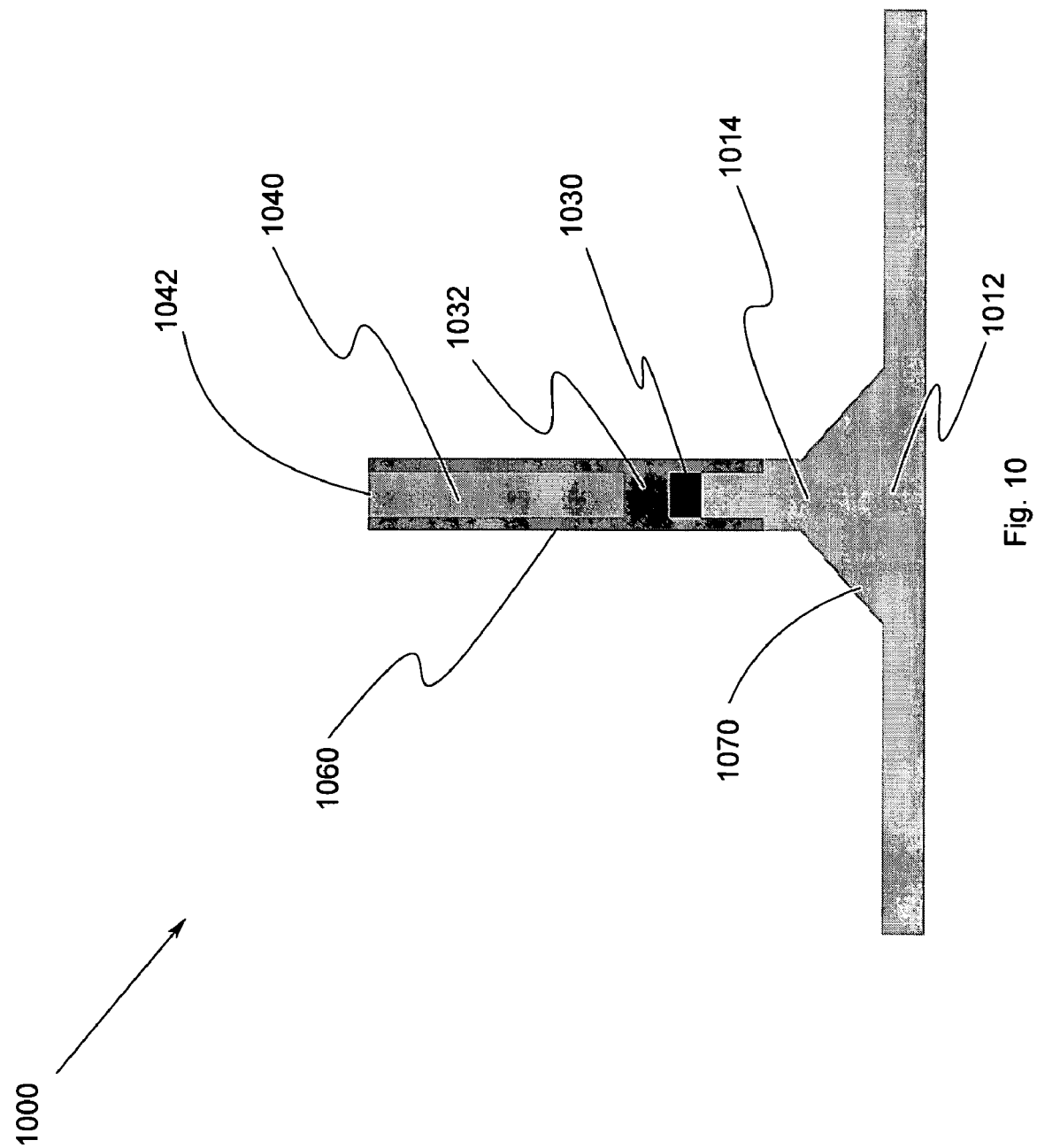
FIG. 10 shows the write head after a final notching process is performed according to an embodiment of the present invention.

FIG. 10 shows the write head 1000 after a final notching process is performed according to an embodiment of the present invention. In FIG. 10, the protective layer is removed from the top 1042 of the second pole layer 1040, the second pole piece layer 1014 and the first pole piece layer 1012 leaving the protective layer on the side of the second pole piece 1040. The protective layer can be removed using ion milling with argon gas. Alternatively other fluorine containing gas (e.g., CHF3) can be used to increase the selectivity between the protective layer and the magnetic material. After further ion milling with argon, material from the second pole piece layer 1014 and the first pole piece layer 1012 is also removed. Thus, the second pole piece layer 1014 is further notched. The notched surface 1070 extends into the first pole piece layer 1012 due to the removal of the material from the first pole piece layer 1012. However, the protective layer 1060 remains at the sides of the second pole layer 1040, the seed layer 1032, the gap layer 1030 and a portion of the first pole piece layer 1014 forming a stair shape notch. The first notch depth may be approximately 50% to 100% of the write gap length. The stair case notch is provided to reduce the on track reluctance to provide more magnetic flux at the track center to aid in writing. The stair case notch is wider than the P2B by approximately 20% to 50%. This is sufficient to lower the on track reluctance, but not too wide to collect the flux into the adjacent track.

Figure 11:
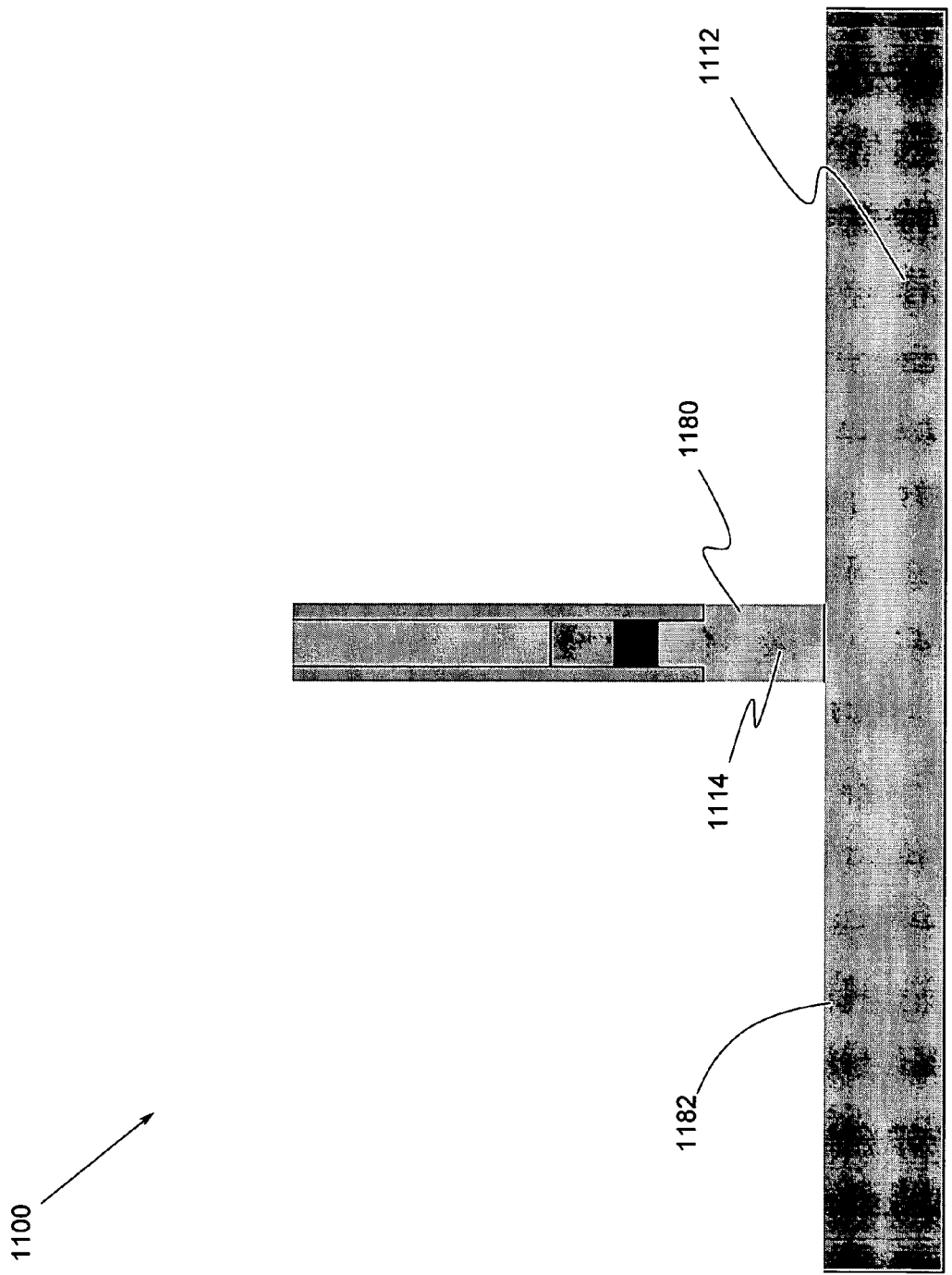
FIG. 11 shows an alternative embodiment of a write head formed according to the present invention.

FIG. 11 shows an alternative embodiment of a write head formed according to the present invention. In this embodiment the P1CAP structure 714 from FIG. 7 is substantially wider (e.g., 100 times) then the second pole piece 740. In FIG. 11, a beam of energetic argon ions is used to mill away material during the final notching process. The argon milling process creates a second pole piece layer 1114 having sides 1180 substantially perpendicular to the top surface 1182 of the first pole piece layer 1112. The result of the argon milling process, as shown in FIG. 11, is that a stair shape notch is 1114 is formed.

Accordingly, the side wall process achieves a stair notching structure at the air-bearing surface while the first pole piece 1112/1114 is protected by gap bump during ion mill in an area recessed from ABS. The flux from the second pole layer 1140 outside of the track will be effectively channeled to the first pole piece 1112/1114 under the gap bump. Because of the protective layer is shielding the sides of the second pole piece from the ion milling process during the second argon notching according to an embodiment of the present invention reduces the variation in the width of the second pole tip 1142 from wafer to wafer during the manufacturing process (P2B sigma) compared to the other processes where no sidewall protection is used.

Figure 12:
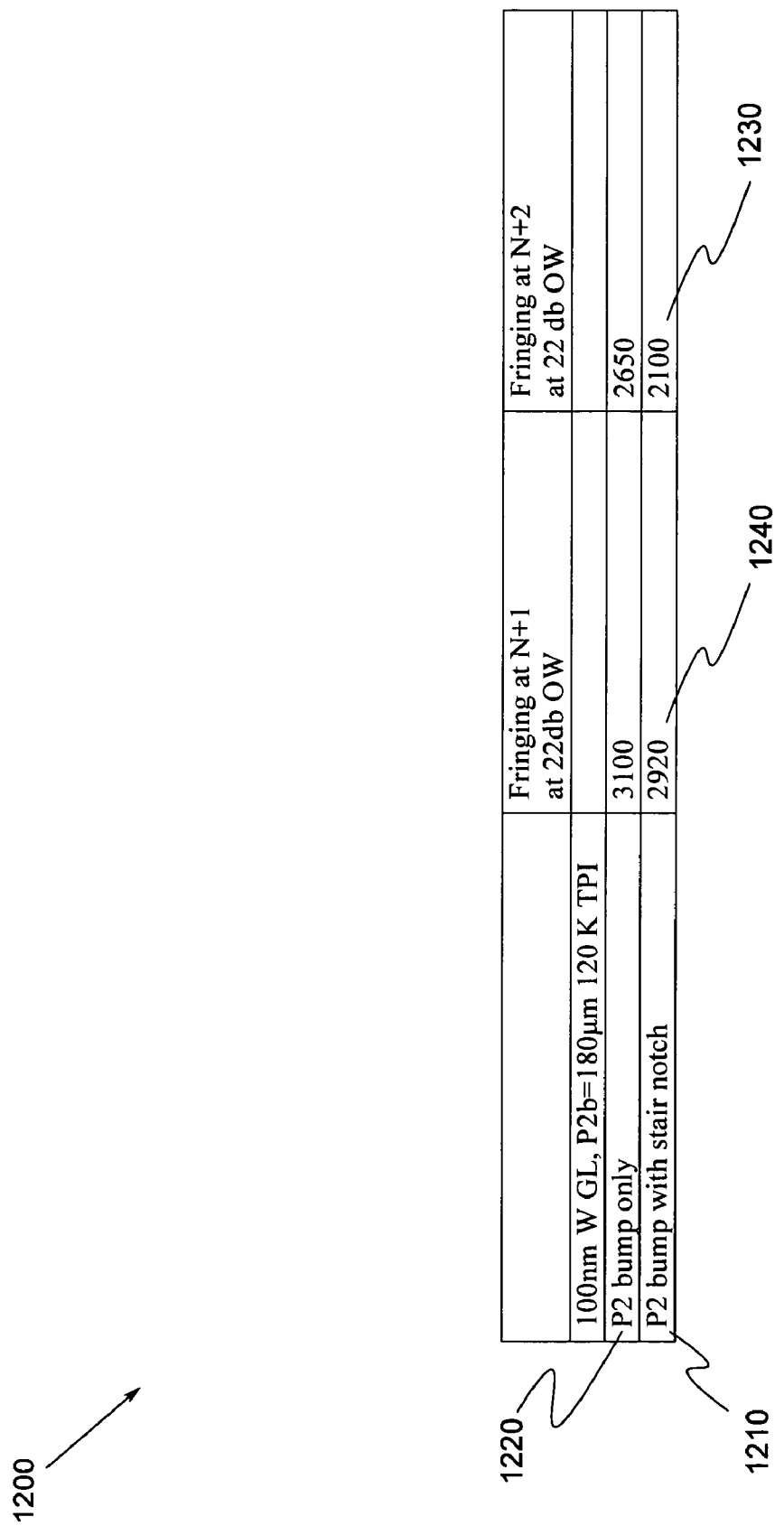
FIG. 12 is a table illustrating a reduction in the fringing fields for a write head having an integrated a stair notch and gap bump at a pole tip according to an embodiment of the present invention.

FIG. 12 is a table 1200 illustrating a reduction in the fringing fields for a write head having an integrated a stair notch and gap bump at a pole tip according to an embodiment of the present invention. The fringing field is the magnetic field that extends to the adjacent track when the current track is being written to. The flux from P2 outside of the track will be effectively channeled to P1 under the alumina bump. As can be seen from FIG. 12, the write head 1210 having an integrated stair notch and gap bump at a pole tip according to an embodiment of the present invention provides an improved fringing field and overwrite capability as compared to other variations in pole tip design, e.g., PPT 1220. The flux from the second pole 1230 outside of the track will be effectively channeled to the first pole piece 1240 under the alumina gap bump. Accordingly, a write head having an integrated notch at the pole tip and a gap bump provides a desired overwrite performance.

Figure 13:
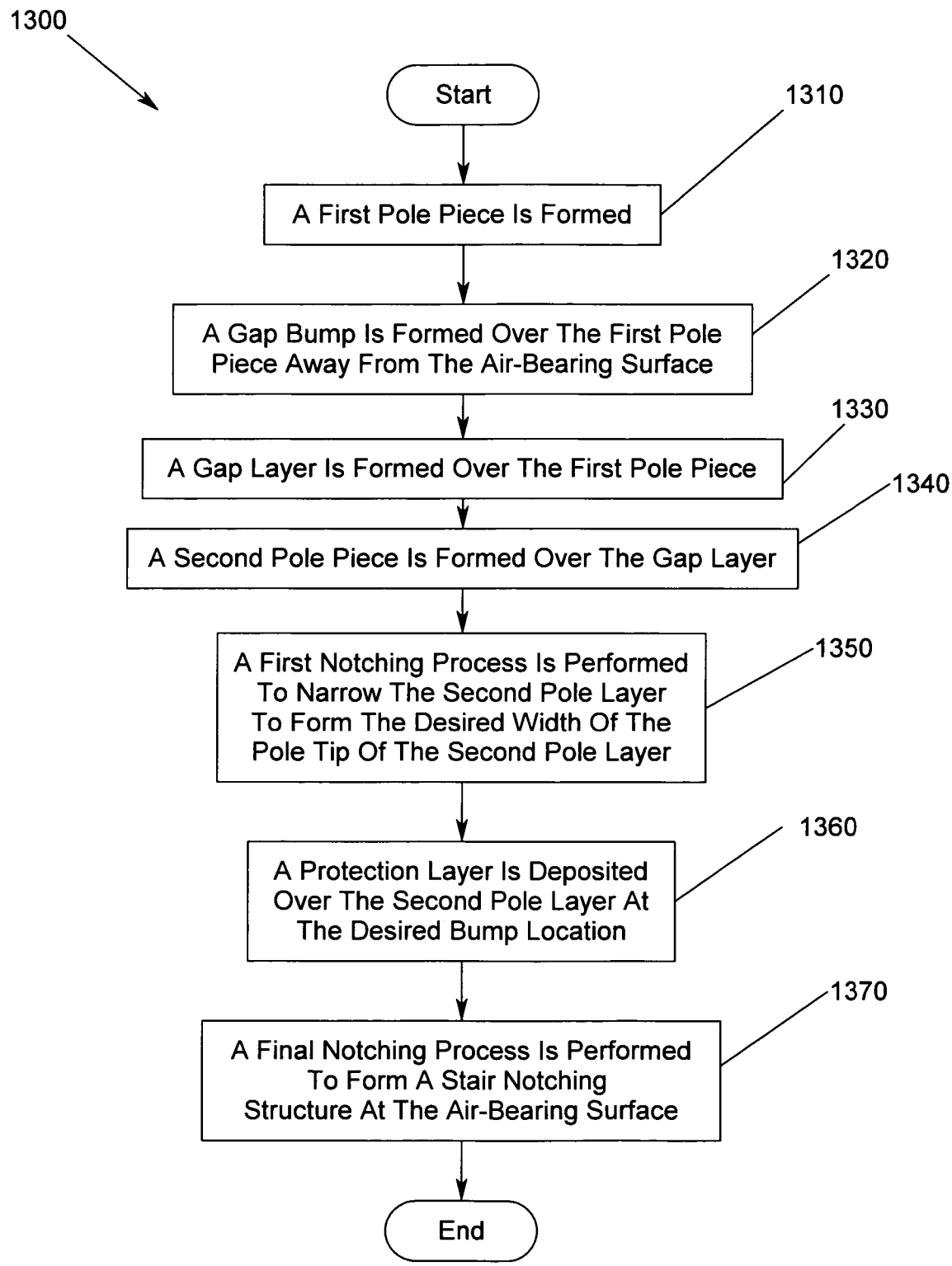
FIG. 13 is a flow chart of the method for integrating a stair notch and a gap bump at a pole tip in a write head according to an embodiment of the present invention.

FIG. 13 is a flow chart of the method for integrating a stair notch and a gap bump at a pole tip in a write head according to an embodiment of the present invention. A first pole piece is formed 1310. A gap bump is formed over the first pole piece away from the air-bearing surface 1320. A gap layer is formed over the first pole piece 1330. The gap layer may be formed over the first pole piece and below the gap bump or over the first pole piece and the gap bump. A second pole piece is formed over the gap layer 1340. A first notching process is performed to narrow the second pole layer to form the desired width of the pole tip of the second pole layer 1350. A protection layer is deposited over the second pole layer at the desired bump location 1360. A final notching process is performed to form a stair notching structure at the air-bearing surface 1370. Accordingly, the stair notching structure is formed while the gap bump protects the first pole piece during the notching process.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming a write head having an integrated stair notch and gap bump, comprising:
    forming a first magnetic pole piece;
    forming a gap bump over the first magnetic pole piece at one end of the first magnetic pole piece away from an air-bearing surface;
    forming a gap layer over the first magnetic pole piece;
    forming a second magnetic pole piece over the gap layer;
    performing a first notching process to narrow the second magnetic pole layer to form a pole tip of the second magnetic pole piece with a predetermined second magnetic pole piece width;
    forming a protection layer over the second magnetic pole piece at a predetermined gap bump location; and
    performing a second notching process to form a stair notching structure in the first magnetic pole piece at the air-bearing surface;
    wherein the gap bump is formed in contact with a magnetic layer.

2. The method of claim 1, wherein the forming the gap layer further comprises forming the gap layer over the first pole piece and below the gap bump.

3. The method of claim 1, wherein the forming the gap layer further comprises forming the gap layer over the first pole piece and the gap bump.

4. The method of claim 1, wherein the gap layer is deposited over the first pole piece before a gap bump is deposited.

5. The method of claim 1 further comprising forming a seed layer over the first pole piece and gap bump before forming the gap layer.

6. The method of claim 1, wherein forming the second pole piece further comprises forming a framing structure having a first and second portion at opposite ends of the gap layer and depositing a material for forming the second pole piece between the first and second portion of the framing structure.

7. The method of claim 6 further comprising removing the framing structure.

8. The method of claim 1, wherein forming the gap bump further comprises depositing a layer of alumina.

9. The method of claim 1, wherein forming the first pole piece further comprises forming a first pole piece layer and forming a second pole piece layer over the first pole piece layer.

10. The method of claim 9, wherein the performing a first notching process further comprises performing a notch and trim ion milling process to narrow the second pole piece and the gap layer and to form a second pole piece layer having a notched portion and a narrowed extending portion.

11. The method of claim 9, wherein the performing the second notching process further comprises removing the protection layer from the top of the second pole piece, the second pole piece layer and the first pole piece layer and removing material from the second pole piece layer and the first pole piece.

12. The method of claim 9, wherein the performing the second notching process further comprises removing the protection layer from the top of the second pole piece, the second pole piece layer and the first pole piece layer and removing material from the second pole piece layer, the removing material from the second pole piece layer creating a second pole piece layer having sides substantially perpendicular to the top surface of the first pole piece layer.

* * * * *

UNITED STATES PATENT AND TRADEMARK OFFICE
CERTIFICATE OF CORRECTION

| | | |
|---|---|---|
| PATENT NO. | : 7,536,774 B2 | Page 1 of 1 |
| APPLICATION NO. | : 11/399821 | |
| DATED | : May 26, 2009 | |
| INVENTOR(S) | : Bedell et al. | |

It is certified that error appears in the above-identified patent and that said Letters Patent is hereby corrected as shown below:

Title page, (73) Assignee: "Technologies B.V., Amsterdam" should read --Technologies Netherlands B.V., Amsterdam--

Signed and Sealed this

Twenty-sixth Day of October, 2010

David J. Kappos
*Director of the United States Patent and Trademark Office*